United States Patent
Bishara et al.

(10) Patent No.: US 8,045,491 B1
(45) Date of Patent: Oct. 25, 2011

(54) SIGNAL HANDLING FOR WIRELESS CLIENTS

(75) Inventors: Nafea Bishara, San Jose, CA (US); Paramesh Gopi, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 538 days.

(21) Appl. No.: 11/328,532

(22) Filed: Jan. 10, 2006

(51) Int. Cl.
- H04B 3/20 (2006.01)
- H04B 1/16 (2006.01)
- H04B 1/38 (2006.01)
- G08C 17/00 (2006.01)
- H04N 7/173 (2011.01)

(52) U.S. Cl. ............ 370/287; 370/311; 455/343.1; 455/343.2; 455/343.3; 455/574; 725/100

(58) Field of Classification Search .......... 370/287, 370/311; 455/343.1–343.4, 574; 725/100
See application file for complete search history.

(56) References Cited

U.S. PATENT DOCUMENTS

| | | | |
|---|---|---|---|
| 5,586,182 A * | 12/1996 | Miyashita | 379/413 |
| 5,606,313 A * | 2/1997 | Allen et al. | 340/10.31 |
| 5,627,882 A * | 5/1997 | Chien et al. | 455/464 |
| 5,768,531 A | 6/1998 | Lin | |
| 5,802,305 A * | 9/1998 | McKaughan et al. | 709/227 |
| 6,848,059 B2 * | 1/2005 | Bullman et al. | 713/323 |
| 2002/0083351 A1 * | 6/2002 | Brabenac | 713/300 |
| 2002/0126677 A1 * | 9/2002 | Hathaway et al. | 370/395.64 |
| 2003/0088765 A1 | 5/2003 | Eschbach et al. | |
| 2004/0187030 A1 | 9/2004 | Edney et al. | |
| 2004/0224728 A1 * | 11/2004 | Dacosta et al. | 455/574 |
| 2005/0041631 A1 | 2/2005 | Aerrabotu et al. | |
| 2005/0059386 A1 | 3/2005 | Li | |
| 2005/0208926 A1 | 9/2005 | Hamada | |
| 2006/0072572 A1 | 4/2006 | Ikeda et al. | |
| 2006/0084457 A1 | 4/2006 | Laha et al. | |
| 2006/0112287 A1 * | 5/2006 | Paljug | 713/300 |
| 2006/0116147 A1 | 6/2006 | Hashizume | |
| 2006/0126596 A1 | 6/2006 | Shieh et al. | |
| 2006/0165107 A1 | 7/2006 | Legallais et al. | |
| 2006/0271797 A1 * | 11/2006 | Ginggen et al. | 713/300 |
| 2007/0064634 A1 | 3/2007 | Huotari et al. | |
| 2008/0028436 A1 | 1/2008 | Hannel et al. | |

FOREIGN PATENT DOCUMENTS

EP 1569404 8/2005

* cited by examiner

Primary Examiner — Marisol Figueroa

(57) ABSTRACT

An apparatus having a corresponding method and computer program comprises an input circuit to receive packets of data from a network; a memory to store packet filter criteria for one or more wireless clients; a filter circuit to drop one or more of the packets of data according to the packet filter criteria; and a wireless output circuit to wirelessly transmit, to the one or more wireless clients, only the packets of data that are not dropped by the filter circuit.

16 Claims, 11 Drawing Sheets

SIGNAL HANDLING FOR WIRELESS CLIENTS

BACKGROUND

The present invention relates generally to data communications. More particularly, the present invention relates to signal handling for wireless clients.

Mobile wireless network devices, such as web-enabled mobile phones, personal digital assistants, and the like, are becoming increasingly popular. Because these devices are battery-powered, it is desirable to reduce the processing performed by the device as much as possible, thereby extending battery life.

SUMMARY

In general, in one aspect, the invention features an apparatus comprising: an input circuit to receive packets of data from a network; a memory to store packet filter criteria for one or more wireless clients; a filter circuit to drop one or more of the packets of data according to the packet filter criteria; and a wireless output circuit to wirelessly transmit, to the one or more wireless clients, only the packets of data that are not dropped by the filter circuit.

In some embodiments, the memory stores network addresses of the one or more wireless clients; and the filter circuit drops the one or more of the packets of data according to the packet filter criteria, destination addresses of the one or more of the packets of data, and the network addresses of the one or more wireless clients. Some embodiments comprise a wireless input circuit to receive wireless signals from the one or more wireless clients, the wireless signals representing one or more commands; and a control circuit to establish the packet filter criteria according to the one or more commands. In some embodiments, the packet filter criteria are selected from the group consisting of: the packet is an Address Resolution Protocol (ARP) packet; the packet is an Internet Control Message Protocol (ICMP) packet; a destination address of the packet is unknown; and a destination network port of the packet does not belong to a predetermined set of network ports.

In general, in one aspect, the invention features an apparatus comprising: means for receiving packets of data from a network; means for storing packet filter criteria for one or more wireless clients; means for dropping one or more of the packets of data according to the packet filter criteria; and means for wirelessly transmitting, to the one or more wireless clients, only the packets of data that are not dropped by the means for dropping.

In some embodiments, the means for storing stores network addresses of the one or more wireless clients; and the means for dropping drops the one or more of the packets of data according to the packet filter criteria, destination addresses of the one or more of the packets of data, and the network addresses of the one or more wireless clients. Some embodiments comprise second means for receiving wireless signals from the one or more wireless clients, the wireless signals representing one or more commands; and means for establishing the packet filter criteria according to the one or more commands. In some embodiments, the packet filter criteria are selected from the group consisting of the packet is an Address Resolution Protocol (ARP) packet; the packet is an Internet Control Message Protocol (ICMP) packet; a destination address of the packet is unknown; and a destination network port of the packet does not belong to a predetermined set of network ports.

In general, in one aspect, the invention features a method comprising: receiving packets of data from a network; storing packet filter criteria for one or more wireless clients; dropping one or more of the packets of data according to the packet filter criteria; and wirelessly transmitting, to the one or more wireless clients, only the packets of data that are not dropped.

Some embodiments comprise storing network addresses of the one or more wireless clients; and dropping the one or more of the packets of data according to the packet filter criteria, destination addresses of the one or more of the packets of data, and the network addresses of the one or more wireless clients. Some embodiments comprise receiving wireless signals from the one or more wireless clients, the wireless signals representing one or more commands; and establishing the packet filter criteria according to the one or more commands. In some embodiments, the packet filter criteria are selected from the group consisting of: the packet is an Address Resolution Protocol (ARP) packet; the packet is an Internet Control Message Protocol (ICMP) packet; a destination address of the packet is unknown; and a destination network port of the packet does not belong to a predetermined set of network ports.

In general, in one aspect, the invention features a computer program for an apparatus, the computer program comprising: receiving packets of data from a network; storing packet filter criteria for one or more wireless clients; dropping one or more of the packets of data according to the packet filter criteria; and causing the apparatus to wirelessly transmit, to the one or more wireless clients, only the packets of data that are not dropped. Some embodiments comprise storing network addresses of the one or more wireless clients; and dropping the one or more of the packets of data according to the packet filter criteria, destination addresses of the one or more of the packets of data, and the network addresses of the one or more wireless clients. Some embodiments comprise establishing the packet filter criteria according to one or more commands represented by wireless signals received from the one or more wireless clients. In some embodiments, the packet filter criteria are selected from the group consisting of: the packet is an Address Resolution Protocol (ARP) packet; the packet is an Internet Control Message Protocol (ICMP) packet; a destination address of the packet is unknown; and a destination network port of the packet does not belong to a predetermined set of network ports.

In general, in one aspect, the invention features an apparatus comprising: an input circuit to receive packets of data from a network; a memory to store packet filter criteria for one or more wireless clients; a filter circuit to select one or more of the packets of data according to the packet filter criteria; a packet circuit to prepare one or more reply packets for each of the packets of data that are selected by the filter circuit; an output circuit to transmit the reply packets to the network.

Some embodiments comprise a wireless output circuit to wirelessly transmit, to the one or more wireless clients, only the packets of data that are not selected by the filter circuit. In some embodiments, the memory stores network addresses of the one or more wireless clients; and the filter circuit selects the one or more of the packets of data according to the packet filter criteria, destination addresses of the one or more of the packets of data, and the network addresses of the one or more wireless clients. Some embodiments comprise a wireless input circuit to receive wireless signals from the one or more wireless clients, the wireless signals representing one or more commands; and a control circuit to establish the packet filter criteria according to the one or more commands. In some embodiments, the packet filter criteria are selected from the group consisting of: the packet is an Address Resolution Protocol (ARP) packet having one of the network addresses of one of the wireless clients as a target address; the packet is an Internet Control Message Protocol (ICMP) echo packet having one of the network addresses of one of the wireless clients as a destination address; and the packet is an Internet Group Messaging Protocol (IGMP) packet having one of the network addresses of one of the wireless clients as a destination address. In some embodiments, the filter circuit drops one or more of the packets of data according to the packet filter criteria. In some embodiments, the memory stores network addresses of the one or more wireless clients; and wherein the filter circuit drops the one or more of the packets of data according to the packet filter criteria, destination addresses of the one or more of the packets of data, and the network addresses of the one or more wireless clients. In some embodiments, the packet filter criteria are selected from the group consisting of: the packet is an Address Resolution Protocol (ARP) packet; the packet is an Internet Control Message Protocol (ICMP) packet; a destination address of the packet is unknown; and a destination network port of the packet does not belong to a predetermined set of network ports.

In general, in one aspect, the invention features an apparatus comprising: means for receiving packets of data from a network; means for storing packet filter criteria for one or more wireless clients; means for selecting one or more of the packets of data according to the packet filter criteria; means for preparing one or more reply packets for each of the packets of data that are selected by the means for selecting; means for transmitting the reply packets to the network.

Some embodiments comprise means for wirelessly transmitting, to the one or more wireless clients, only the packets of data that are not selected by the means for selecting. In some embodiments, the means for storing stores network addresses of the one or more wireless clients; and the means for selecting selects the one or more of the packets of data according to the packet filter criteria, destination addresses of the one or more of the packets of data, and the network addresses of the one or more wireless clients. Some embodiments comprise means for receiving wireless signals from the one or more wireless clients, the wireless signals representing one or more commands; and means for establishing the packet filter criteria according to the one or more commands. In some embodiments, the packet filter criteria are selected from the group consisting of: the packet is an Address Resolution Protocol (ARP) packet having one of the network addresses of one of the wireless clients as a target address; the packet is an Internet Control Message Protocol (ICMP) echo packet having one of the network addresses of one of the wireless clients as a destination address; and the packet is an Internet Group Messaging Protocol (IGMP) packet having one of the network addresses of one of the wireless clients as a destination address. In some embodiments, the means for selecting drops one or more of the packets of data according to the packet filter criteria. In some embodiments, the means for storing stores network addresses of the one or more wireless clients; and the means for selecting drops the one or more of the packets of data according to the packet filter criteria, destination addresses of the one or more of the packets of data, and the network addresses of the one or more wireless clients. In some embodiments, the packet filter criteria are selected from the group consisting of: the packet is an Address Resolution Protocol (ARP) packet; the packet is an Internet Control Message Protocol (ICMP) packet; a destination address of the packet is unknown; and a destination network port of the packet does not belong to a predetermined set of network ports.

In general, in one aspect, the invention features a method comprising: receiving packets of data from a network; storing packet filter criteria for one or more wireless clients; selecting one or more of the packets of data according to the packet filter criteria; preparing one or more reply packets for each of the packets of data that are selected by the filter circuit; and transmitting the reply packets to the network.

Some embodiments comprise wirelessly transmitting, to the one or more wireless clients, only the packets of data that are not selected. Some embodiments comprise storing network addresses of the one or more wireless clients; and selecting the one or more of the packets of data according to the packet filter criteria, destination addresses of the one or more of the packets of data, and the network addresses of the one or more wireless clients. Some embodiments comprise receiving wireless signals from the one or more wireless clients, the wireless signals representing one or more commands; and establishing the packet filter criteria according to the one or more commands. In some embodiments, the packet filter criteria are selected from the group consisting of: the packet is an Address Resolution Protocol (ARP) packet having one of the network addresses of one of the wireless clients as a target address; the packet is an Internet Control Message Protocol (ICMP) echo packet having one of the network addresses of one of the wireless clients as a destination address; and the packet is an Internet Group Messaging Protocol (IGMP) packet having one of the network addresses of one of the wireless clients as a destination address. Some embodiments comprise dropping one or more of the packets of data according to the packet filter criteria. Some embodiments comprise storing network addresses of the one or more wireless clients; and dropping the one or more of the packets of data according to the packet filter criteria, destination addresses of the one or more of the packets of data, and the network addresses of the one or more wireless clients. In some embodiments, the packet filter criteria are selected from the group consisting of the packet is an Address Resolution Protocol (ARP) packet; the packet is an Internet Control Message Protocol (ICMP) packet; a destination address of the packet is unknown; and a destination network port of the packet does not belong to a predetermined set of network ports.

In general, in one aspect, the invention features a computer program for an apparatus, the computer program comprising: receiving packets of data from a network; storing packet filter criteria for one or more wireless clients; selecting one or more of the packets of data according to the packet filter criteria; preparing one or more reply packets for each of the packets of data that are selected by the filter circuit; and causing the apparatus to transmit the reply packets to the network.

Some embodiments comprise causing the apparatus to wirelessly transmit, to the one or more wireless clients, only the packets of data that are not selected. Some embodiments comprise storing network addresses of the one or more wireless clients; and selecting the one or more of the packets of data according to the packet filter criteria, destination addresses of the one or more of the packets of data, and the network addresses of the one or more wireless clients. Some embodiments comprise establishing the packet filter criteria according to one or more commands represented by wireless signals received by the apparatus from the one or more wireless clients. In some embodiments, the packet filter criteria are selected from the group consisting of: the packet is an Address Resolution Protocol (ARP) packet having one of the network addresses of one of the wireless clients as a target address; the packet is an Internet Control Message Protocol (ICMP) echo packet having one of the network addresses of one of the wireless clients as a destination address; and the packet is an Internet Group Messaging Protocol (IGMP) packet having one of the network addresses of one of the wireless clients as a destination address. Some embodiments comprise dropping one or more of the packets of data according to the packet filter criteria. Some embodiments comprise storing network addresses of the one or more wireless clients; and dropping the one or more of the packets of data according to the packet filter criteria, destination addresses of the one or more of the packets of data, and the network addresses of the one or more wireless clients. In some embodiments, the packet filter criteria are selected from the group consisting of: the packet is an Address Resolution Protocol (ARP) packet; the packet is an Internet Control Message Protocol (ICMP) packet; a destination address of the packet is unknown; and a destination network port of the packet does not belong to a predetermined set of network ports.

In general, in one aspect, the invention features an apparatus comprising: an input circuit to receive packets of data from a network; a wireless output circuit to transmit respective ones of the packets of data wirelessly to one or more wireless clients; a wireless input circuit to receive wireless signals from the one or more wireless clients; and an output circuit to transmit one or more predetermined packets repeatedly to the network on behalf of one of the wireless clients in response to a respective one of the wireless signals received by the wireless input circuit from the one of the wireless clients.

In some embodiments, the output circuit transmits the one or more predetermined packets periodically. In some embodiments, the wireless signals represent one or more commands, and the apparatus further comprises: a packet circuit to generate the one or more predetermined packets according to the one of more commands. In some embodiments, the one or more predetermined packets are selected from the group consisting of an Internet Group Messaging Protocol (IGMP) periodic join packet; and a Dynamic Host Configuration Protocol (DHCP) keep-alive packet. Some embodiments comprise a memory to store packet filter criteria for the one or more wireless clients; a filter circuit to select one or more of the packets of data according to the packet filter criteria; and a packet circuit to prepare one or more reply packets for each of the packets of data that are selected by the filter circuit, wherein the output circuit transmits the reply packets to the network. In some embodiments, the wireless output circuit transmits only the packets of data that are not selected by the filter circuit. In some embodiments, the memory stores network addresses of the one or more wireless clients; and the filter circuit selects the one or more of the packets of data according to the packet filter criteria, destination addresses of the one or more of the packets of data, and the network addresses of the one or more wireless clients. In some embodiments, the wireless signals represent one or more commands, further comprising: a control circuit to establish the packet filter criteria according to the one or more commands. In some embodiments, the packet filter criteria are selected from the group consisting of: the packet is an Address Resolution Protocol (ARP) packet having one of the network addresses of one of the wireless clients as a target address; the packet is an Internet Control Message Protocol (ICMP) echo packet having one of the network addresses of one of the wireless clients as a destination address; and the packet is an Internet Group Messaging Protocol (IGMP) packet having one of the network addresses of one of the wireless clients as a destination address. In some embodiments, the filter circuit drops one or more of the packets of data according to the packet filter criteria. In some embodiments, the memory stores network addresses of the one or more wireless clients; and the filter circuit drops the one or more of the packets of data according to the packet filter criteria, destination addresses of the one or more of the packets of data, and the network addresses of the one or more wireless clients. In some embodiments, the packet filter criteria are selected from the group consisting of: the packet is an Address Resolution Protocol (ARP) packet; the packet is an Internet Control Message Protocol (ICMP) packet; a destination address of the packet is unknown; and a destination network port of the packet does not belong to a predetermined set of network ports. Some embodiments comprise a memory to store packet filter criteria for the one or more wireless clients; and a filter circuit to drop one or more of the packets of data according to the packet filter criteria, wherein the wireless output circuit transmits only the packets of data that are not dropped by the filter circuit. In some embodiments, the memory stores network addresses of the one or more wireless clients; and the filter circuit drops the one or more of the packets of data according to the packet filter criteria, destination addresses of the one or more of the packets of data, and the network addresses of the one or more wireless clients. Some embodiments comprise, wherein the wireless signals represent one or more commands, a control circuit to establish the packet filter criteria according to the one or more commands. In some embodiments, the packet filter criteria are selected from the group consisting of: the packet is an Address Resolution Protocol (ARP) packet; the packet is an Internet Control Message Protocol (ICMP) packet; a destination address of the packet is unknown; and a destination network port of the packet does not belong to a predetermined set of network ports.

In general, in one aspect, the invention features an apparatus comprising: means for receiving packets of data from a network; first means for transmitting respective ones of the packets of data wirelessly to one or more wireless clients; means for receiving wireless signals from the one or more wireless clients; and second means for transmitting one or more predetermined packets repeatedly to the network on behalf of one of the wireless clients in response to a respective one of the wireless signals received by the wireless input circuit from the one of the wireless clients.

In some embodiments, the second means for transmitting transmits the one or more predetermined packets periodically. Some embodiments comprise, wherein the wireless signals represent one or more commands, means for generating the one or more predetermined packets according to the one of more commands. In some embodiments, the one or more predetermined packets are selected from the group consisting of: an Internet Group Messaging Protocol (IGMP) periodic join packet; and a Dynamic Host Configuration Protocol (DHCP) keep-alive packet. Some embodiments comprise means for storing packet filter criteria for the one or more wireless clients; means for selecting one or more of the packets of data according to the packet filter criteria; and means for preparing one or more reply packets for each of the packets of data that are selected by the means for selecting, wherein the second means for transmitting transmits the reply packets to the network. In some embodiments, the first means for transmitting transmits only the packets of data that are not selected by the means for selecting. In some embodiments, the means for storing stores network addresses of the one or more wireless clients; and wherein the means for selecting selects the one or more of the packets of data according to the packet filter criteria, destination addresses of the one or more of the packets of data, and the network addresses of the one or more wireless clients. Some embodiments comprise, wherein the wireless signals represent one or more commands, means for establishing the packet filter criteria according to the one or more commands. In some embodiments, the packet filter criteria are selected from the group consisting of: the packet is an Address Resolution Protocol (ARP) packet having one of the network addresses of one of the wireless clients as a target address; the packet is an Internet Control Message Protocol (ICMP) echo packet having one of the network addresses of one of the wireless clients as a destination address; and the packet is an Internet Group Messaging Protocol (IGMP) packet having one of the network addresses of one of the wireless clients as a destination address. In some embodiments, the means for selecting drops one or more of the packets of data according to the packet filter criteria. In some embodiments, the means for storing stores network addresses of the one or more wireless clients; and the means for selecting drops the one or more of the packets of data according to the packet filter criteria, destination addresses of the one or more of the packets of data, and the network addresses of the one or more wireless clients. In some embodiments, the packet filter criteria are selected from the group consisting of: the packet is an Address Resolution Protocol (ARP) packet; the packet is an Internet Control Message Protocol (ICMP) packet; a destination address of the packet is unknown; and a destination network port of the packet does not belong to a predetermined set of network ports. Some embodiments comprise means for storing packet filter criteria for the one or more wireless clients; and means for dropping one or more of the packets of data according to the packet filter criteria, wherein the first means for transmitting transmits only the packets of data that are not dropped by the means for dropping. In some embodiments, the memory stores network addresses of the one or more wireless clients; and the means for dropping drops the one or more of the packets of data according to the packet filter criteria, destination addresses of the one or more of the packets of data, and the network addresses of the one or more wireless clients. Some embodiments comprise, wherein the wireless signals represent one or more commands, means for establishing the packet filter criteria according to the one or more commands. In some embodiments, the packet filter criteria are selected from the group consisting of: the packet is an Address Resolution Protocol (ARP) packet; the packet is an Internet Control Message Protocol (ICMP) packet; a destination address of the packet is unknown; and a destination network port of the packet does not belong to a predetermined set of network ports.

In general, in one aspect, the invention features a method comprising: receiving packets of data from a network; transmitting respective ones of the packets of data wirelessly to one or more wireless clients; receiving wireless signals from the one or more wireless clients; and transmitting one or more predetermined packets repeatedly to the network on behalf of one of the wireless clients in response to a respective one of the wireless signals received from the one of the wireless clients.

Some embodiments comprise transmitting the one or more predetermined packets periodically. Some embodiments comprise, wherein the wireless signals represent one or more commands, generating the one or more predetermined packets according to the one of more commands. In some embodiments, the one or more predetermined packets are selected from the group consisting of: an Internet Group Messaging Protocol (IGMP) periodic join packet; and a Dynamic Host Configuration Protocol (DHCP) keep-alive packet. Some embodiments comprise storing packet filter criteria for the one or more wireless clients; selecting one or more of the packets of data according to the packet filter criteria; preparing one or more reply packets for each of the selected packets of data; and transmitting the reply packets to the network. Some embodiments comprise wirelessly transmitting only the packets of data that are not selected to the one or more wireless clients. Some embodiments comprise storing network addresses of the one or more wireless clients; and selecting the one or more of the packets of data according to the packet filter criteria, destination addresses of the one or more of the packets of data, and the network addresses of the one or more wireless clients. Some embodiments comprise, wherein the wireless signals represent one or more commands, establishing the packet filter criteria according to the one or more commands. In some embodiments, the packet filter criteria are selected from the group consisting of: the packet is an Address Resolution Protocol (ARP) packet having one of the network addresses of one of the wireless clients as a target address; the packet is an Internet Control Message Protocol (ICMP) echo packet having one of the network addresses of one of the wireless clients as a destination address; and the packet is an Internet Group Messaging Protocol (IGMP) packet having one of the network addresses of one of the wireless clients as a destination address. Some embodiments comprise dropping one or more of the packets of data according to the packet filter criteria. Some embodiments comprise storing network addresses of the one or more wireless clients; and dropping the one or more of the packets of data according to the packet filter criteria, destination addresses of the one or more of the packets of data, and the network addresses of the one or more wireless clients. In some embodiments, the packet filter criteria are selected from the group consisting of: the packet is an Address Resolution Protocol (ARP) packet; the packet is an Internet Control Message Protocol (ICMP) packet; a destination address of the packet is unknown; and a destination network port of the packet does not belong to a predetermined set of network ports. Some embodiments comprise storing packet filter criteria for the one or more wireless clients; dropping one or more of the packets of data according to the packet filter criteria; and wirelessly transmitting only the packets of data that are not dropped. Some embodiments comprise storing network addresses of the one or more wireless clients; and dropping the one or more of the packets of data according to the packet filter criteria, destination addresses of the one or more of the packets of data, and the network addresses of the one or more wireless clients. Some embodiments comprise, wherein the wireless signals represent one or more commands, establishing the packet filter criteria according to the one or more commands. In some embodiments, the packet filter criteria are selected from the group consisting of: the packet is an Address Resolution Protocol (ARP) packet; the packet is an Internet Control Message Protocol (ICMP) packet; a destination address of the packet is unknown; and a destination network port of the packet does not belong to a predetermined set of network ports.

In general, in one aspect, the invention features a computer program for an apparatus, the computer program comprising: receiving packets of data from a network; causing the apparatus to transmit respective ones of the packets of data wirelessly to one or more wireless clients; and causing the apparatus to transmit one or more predetermined packets repeatedly to the network on behalf of one of the wireless clients in response to a wireless signal received from the one of the wireless clients.

Some embodiments comprise causing the apparatus to transmit the one or more predetermined packets periodically. Some embodiments comprise, wherein the wireless signals represent one or more commands, generating the one or more predetermined packets according to the one of more commands. In some embodiments, the one or more predetermined packets are selected from the group consisting of: an Internet Group Messaging Protocol (IGMP) periodic join packet; and a Dynamic Host Configuration Protocol (DHCP) keep-alive packet. Some embodiments comprise storing packet filter criteria for the one or more wireless clients; selecting one or more of the packets of data according to the packet filter criteria; preparing one or more reply packets for each of the selected packets of data; and causing the apparatus to transmit the reply packets to the network. Some embodiments comprise causing the apparatus to transmit wirelessly only the packets of data that are not selected to the one or more wireless clients. Some embodiments comprise storing network addresses of the one or more wireless clients; and selecting the one or more of the packets of data according to the packet filter criteria, destination addresses of the one or more of the packets of data, and the network addresses of the one or more wireless clients. Some embodiments comprise, wherein the wireless signals represent one or more commands, establishing the packet filter criteria according to the one or more commands. In some embodiments, the packet filter criteria are selected from the group consisting of: the packet is an Address Resolution Protocol (ARP) packet having one of the network addresses of one of the wireless clients as a target address; the packet is an Internet Control Message Protocol (ICMP) echo packet having one of the network addresses of one of the wireless clients as a destination address; and the packet is an Internet Group Messaging Protocol (IGMP) packet having one of the network addresses of one of the wireless clients as a destination address. Some embodiments comprise dropping one or more of the packets of data according to the packet filter criteria. Some embodiments comprise storing network addresses of the one or more wireless clients; and dropping the one or more of the packets of data according to the packet filter criteria, destination addresses of the one or more of the packets of data, and the network addresses of the one or more wireless clients. In some embodiments, the packet filter criteria are selected from the group consisting of: the packet is an Address Resolution Protocol (ARP) packet; the packet is an Internet Control Message Protocol (ICMP) packet; a destination address of the packet is unknown; and a destination network port of the packet does not belong to a predetermined set of network ports. Some embodiments comprise storing packet filter criteria for the one or more wireless clients; dropping one or more of the packets of data according to the packet filter criteria; and causing the apparatus to transmit wirelessly only the packets of data that are not dropped. Some embodiments comprise storing network addresses of the one or more wireless clients; and dropping the one or more of the packets of data according to the packet filter criteria, destination addresses of the one or more of the packets of data, and the network addresses of the one or more wireless clients. Some embodiments comprise, wherein the wireless signals represent one or more commands, establishing the packet filter criteria according to the one or more commands. In some embodiments, the packet filter criteria are selected from the group consisting of: the packet is an Address Resolution Protocol (ARP) packet; the packet is an Internet Control Message Protocol (ICMP) packet; a destination address of the packet is unknown; and a destination network port of the packet does not belong to a predetermined set of network ports.

In general, in one aspect, the invention features an apparatus comprising: a wireless input circuit to receive first wireless signals, and to generate first wired signals based on the first wireless signals; a wireless output circuit to transmit second wireless signals based on second wired signals; a processing circuit to process the first wired signals, and to generate the second wired signals, only when enabled; and a control circuit to enable the processing circuit when the first wired signals meet predetermined criteria, and to disable the processing circuit when the first wired signals do not meet the predetermined criteria.

In some embodiments, the predetermined criteria comprise at least one of the group consisting of: predetermined physical-layer criteria; predetermined data link-layer criteria; predetermined network-layer criteria; and predetermined transport-layer criteria. In some embodiments, to disable the processing circuit, the control circuit disconnects a power supply from the processing circuit. In some embodiments, the control circuit generates the second wired signals in response to the first wired signals when the first wired signals do not meet the predetermined criteria. Some embodiments comprise a human interface circuit to interface with humans only when enabled; wherein the control circuit enables the human interface circuit when the first wired signals meet the predetermined criteria, and disables the human interface circuit when the first wired signals do not meet the predetermined criteria. In some embodiments, to disable the human interface circuit, the control circuit disconnects a power supply from the human interface circuit. Some embodiments comprise a wireless client comprising the apparatus. Some embodiments comprise a mobile phone comprising the wireless client. Some embodiments comprise a personal digital assistant comprising the wireless client.

In general, in one aspect, the invention features an apparatus comprising: means for receiving first wireless signals, and for generating first wired signals based on the first wireless signals; means for transmitting second wireless signals based on second wired signals; means for processing the first wired signals, and for generating the second wired signals, only when enabled; and control means for enabling the means for processing when the first wired signals meet predetermined criteria, and for disabling the means for processing when the first wired signals do not meet the predetermined criteria.

In some embodiments, the predetermined criteria comprise at least one of the group consisting of: predetermined physical-layer criteria; predetermined data link-layer criteria; predetermined network-layer criteria; and predetermined transport-layer criteria. In some embodiments, for disabling the means for processing, the control means disconnects a power supply from the means for processing. In some embodiments, the control means generates the second wired signals in response to the first wired signals when the first wired signals do not meet the predetermined criteria. Some embodiments comprise means for interfacing with humans only when enabled; wherein the control means enables the means for interfacing when the first wired signals meet the predetermined criteria, and disables the means for interfacing when the first wired signals do not meet the predetermined criteria. In some embodiments, for disabling the means for interfacing, the control means disconnects a power supply from the means for interfacing. Some embodiments comprise a wireless client comprising the apparatus. Some embodiments comprise a mobile phone comprising the wireless client. Some embodiments comprise a personal digital assistant comprising the wireless client.

In general, in one aspect, the invention features a method for an apparatus comprising a processing circuit, the method comprising: receiving first wireless signals; generating first wired signals based on the first wireless signals; transmitting second wireless signals based on second wired signals; enabling the processing circuit to process the first wired signals, and to generate the second wired signals, only when the first wired signals meet predetermined criteria.

In some embodiments, the predetermined criteria comprise at least one of the group consisting of: predetermined physical-layer criteria; predetermined data link-layer criteria; predetermined network-layer criteria; and predetermined transport-layer criteria. Some embodiments comprise disconnecting a power supply from the processing circuit when the first wired signals do not meet predetermined criteria. Some embodiments comprise generating the second wired signals in response to the first wired signals when the first wired signals do not meet the predetermined criteria. Some embodiments comprise, wherein the apparatus further comprises a human interface circuit, enabling the human interface circuit when the first wired signals meet the predetermined criteria; and disabling the human interface circuit when the first wired signals do not meet the predetermined criteria. Some embodiments comprise disconnecting a power supply from the human interface circuit when the first wired signals do not meet the predetermined criteria. Some embodiments comprise a wireless client to perform the method. Some embodiments comprise a mobile phone comprising the wireless client. Some embodiments comprise a personal digital assistant comprising the wireless client.

In general, in one aspect, the invention features a computer program for an apparatus comprising a processing circuit, the computer program comprising, wherein the apparatus receives first wireless signals and generates first wired signals based on the first wireless signals; causing the apparatus to transmit second wireless signals based on second wired signals; and enabling the processing circuit to process the first wired signals, and to generate the second wired signals, only when the first wired signals meet predetermined criteria.

In some embodiments, the predetermined criteria comprise at least one of the group consisting of: predetermined physical-layer criteria; predetermined data link-layer criteria; predetermined network-layer criteria; and predetermined transport-layer criteria. Some embodiments comprise causing the apparatus to disconnect a power supply from the processing circuit when the first wired signals do not meet predetermined criteria. Some embodiments comprise causing the apparatus to generate the second wired signals in response to the first wired signals when the first wired signals do not meet the predetermined criteria. Some embodiments comprise, wherein the apparatus further comprises a human interface circuit, enabling the human interface circuit when the first wired signals meet the predetermined criteria; and disabling the human interface circuit when the first wired signals do not meet the predetermined criteria. Some embodiments comprise causing the apparatus to disconnect a power supply from the human interface circuit when the first wired signals do not meet the predetermined criteria. Some embodiments comprise a wireless client to execute the computer program. Some embodiments comprise a mobile phone comprising the wireless client. Some embodiments comprise a personal digital assistant comprising the wireless client.

The details of one or more implementations are set forth in the accompanying drawings and the description below. Other features will be apparent from the description and drawings, and from the claims.

Figure 1:
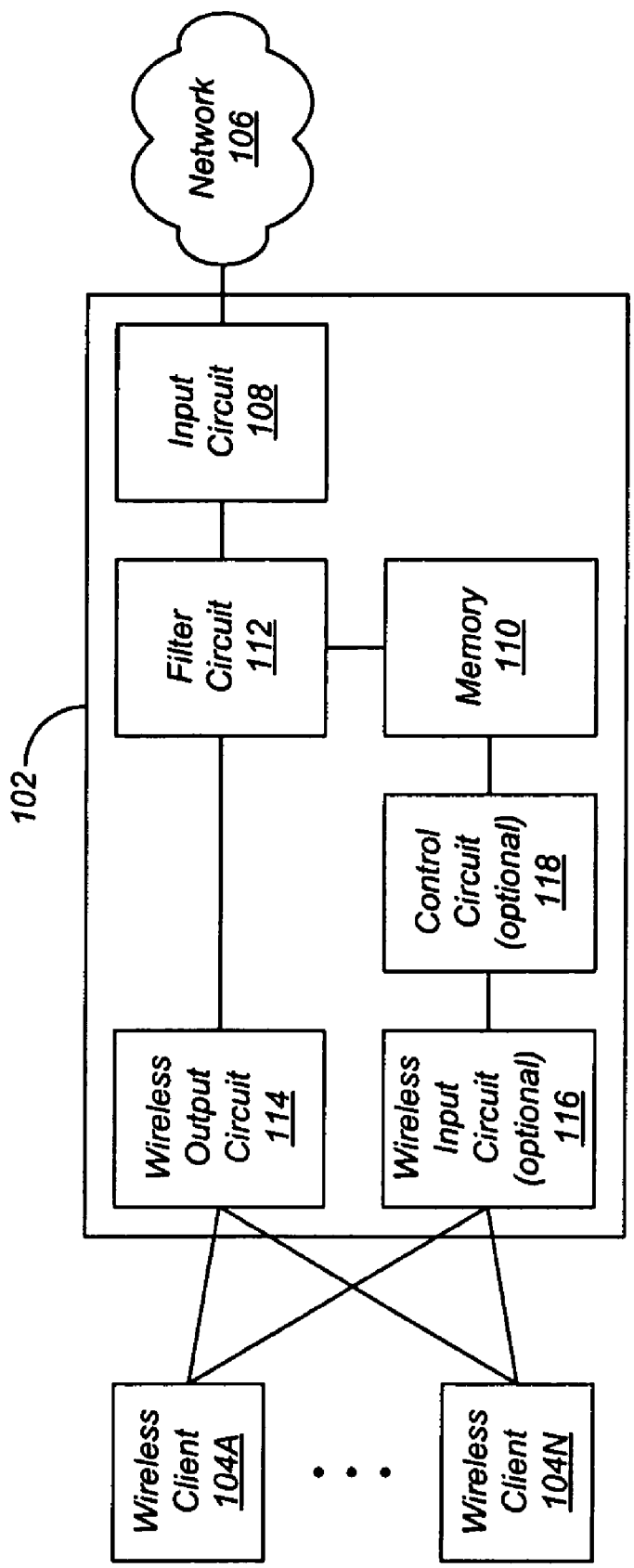
FIG. 1 shows an apparatus in communication with one or more wireless clients and a network for filtering packets addressed to wireless clients according to a preferred embodiment of the present invention.

The leading digit(s) of each reference numeral used in this specification indicates the number of the drawing in which the reference numeral first appears.

DETAILED DESCRIPTION

Some embodiments of the present invention provide wireless data communications apparatus, having corresponding methods and computer programs, to provide routine packet handling on behalf of thin clients. Various embodiments of the present invention filter packets addressed to thin clients, reply to packets addressed to thin clients, generate and transmit packets on behalf of thin clients, and perform various combinations thereof.

FIG. 1 shows an apparatus 102 in communication with one or more wireless clients 104A-N and a network 106 for filtering packets addressed to wireless clients 104 according to a preferred embodiment of the present invention. Network 106 can comprise a local-area network, the Internet, and the like. Apparatus 102 comprises an input circuit 108 in communication with network 106, a memory 110, a filter circuit 112, and a wireless output circuit 114 in communication with wireless clients 104.

Apparatus 102 can be implemented as one or more units in various configurations. For example, apparatus 102 can be implemented as one or more "thin" access points and a wireless switch that manages the thin access points. As another example, apparatus 102 can be implemented as one or more "thin" wireless terminal points and an access controller that manages the thin wireless terminal points. As another example, apparatus 102 can be implemented as one or more fully-functional access points. Of course, other configurations are possible, and embodiments of the present invention are not limited to any particular configuration.

Figure 2:
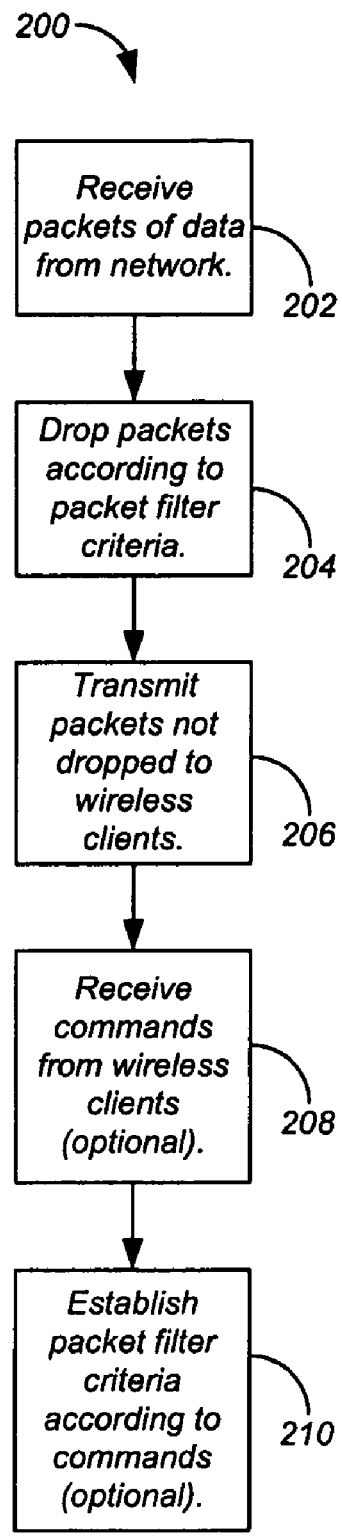
FIG. 2 shows a process for the apparatus of FIG. 1 according to a preferred embodiment of the present invention.

FIG. 2 shows a process 200 for apparatus 102 of FIG. 1 according to a preferred embodiment of the present invention. Input circuit 108 receives packets of data from network 106 (step 202). Filter circuit 112 drops one or more of the packets of data according to packet filter criteria stored in memory 110 for wireless clients 104 (step 204). Wireless output circuit 114 wirelessly transmits, to wireless clients 104, only the packets of data that are not dropped by filter circuit 112 (step 206).

By performing process 200 of FIG. 2, apparatus 102 offloads processing of routine packets from wireless clients 104. The packet filter criteria specifies which packets should be dropped and not forwarded to wireless clients 104. These packets can include, for example, Address Resolution Protocol (ARP) packets, Internet Control Message Protocol (ICMP) packets, packets having an unknown destination address, packets directed to certain network ports such as certain TCP ports, and the like. For example, the packet filter criteria can specify that only web traffic should pass to wireless clients 104, and therefore that packets directed to ports other than TCP port 80 should be dropped.

The packet filter criteria can apply to all wireless clients 104 served by apparatus 102, or can be specific to each wireless client 104. For example, memory 110 stores the network addresses of wireless clients 104, and filter circuit 112 drops the packets of data according to the packet filter criteria, destination addresses of the packets of data, and the network addresses of wireless clients 104.

In some embodiments, the packet filter criteria is provisioned in advance of operation, by a remote controller, and the like. In other embodiments, the packet filter criteria is established by wireless clients 104. For example, referring again to FIG. 1, apparatus 102 optionally comprises a wireless input circuit 116 in communication with wireless clients 104 and a control circuit 118. Referring again to FIG. 2, wireless input circuit 116 receives wireless signals representing one or more commands from wireless clients 104 (step 208), and control circuit 118 establishes the packet filter criteria according to the commands (step 210).

Figure 3:
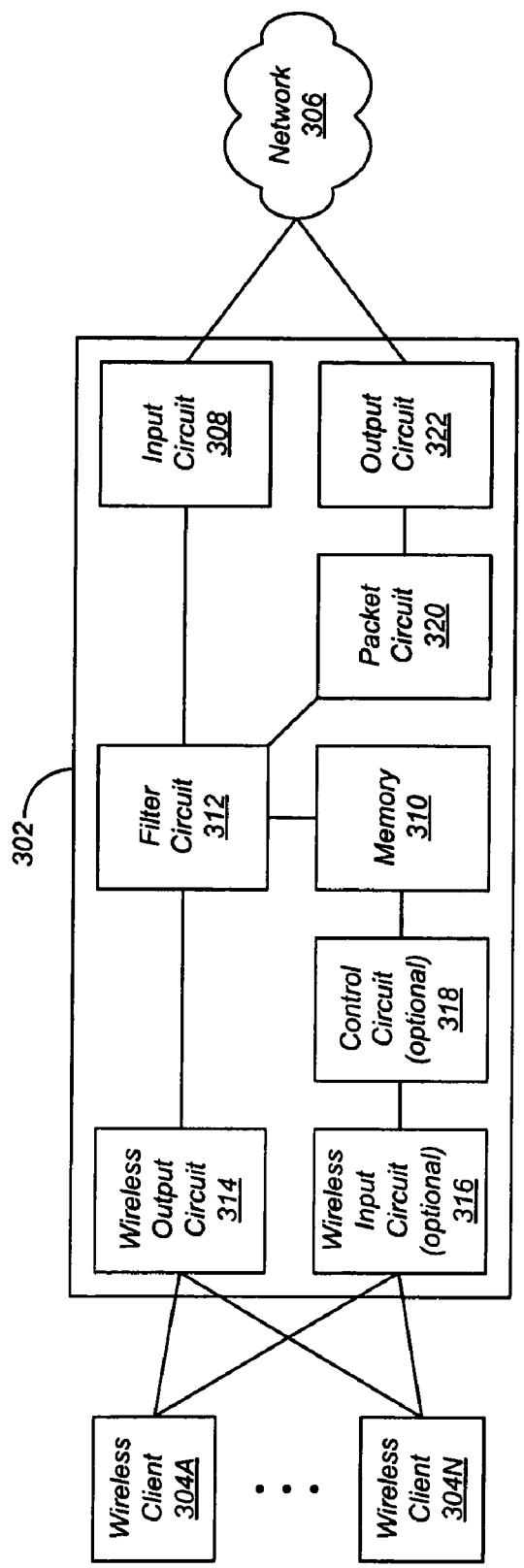
FIG. 3 shows an apparatus in communication with one or more wireless clients and a network for replying to packets on behalf of wireless clients according to a preferred embodiment of the present invention.

FIG. 3 shows an apparatus 302 in communication with one or more wireless clients 304A-N and a network 306 for replying to packets on behalf of wireless clients 304 according to a preferred embodiment of the present invention. Network 306 can comprise a local-area network, the Internet, and the like. Apparatus 302 comprises an input circuit 308 in communication with network 306, a memory 310, a filter circuit 312, a wireless output circuit 314 in communication with wireless clients 304, a packet circuit 320, and an output circuit 322 in communication with network 306.

Apparatus 302 can be implemented as one or more units in various configurations. For example, apparatus 302 can be implemented as one or more thin access points and a wireless switch that manages the thin access points. As another example, apparatus 302 can be implemented as one or more thin wireless terminal points and an access controller that manages the thin wireless terminal points. As another example, apparatus 302 can be implemented as one or more fully-functional access points. Of course, other configurations are possible, and embodiments of the present invention are not limited to any particular configuration.

Figure 4:
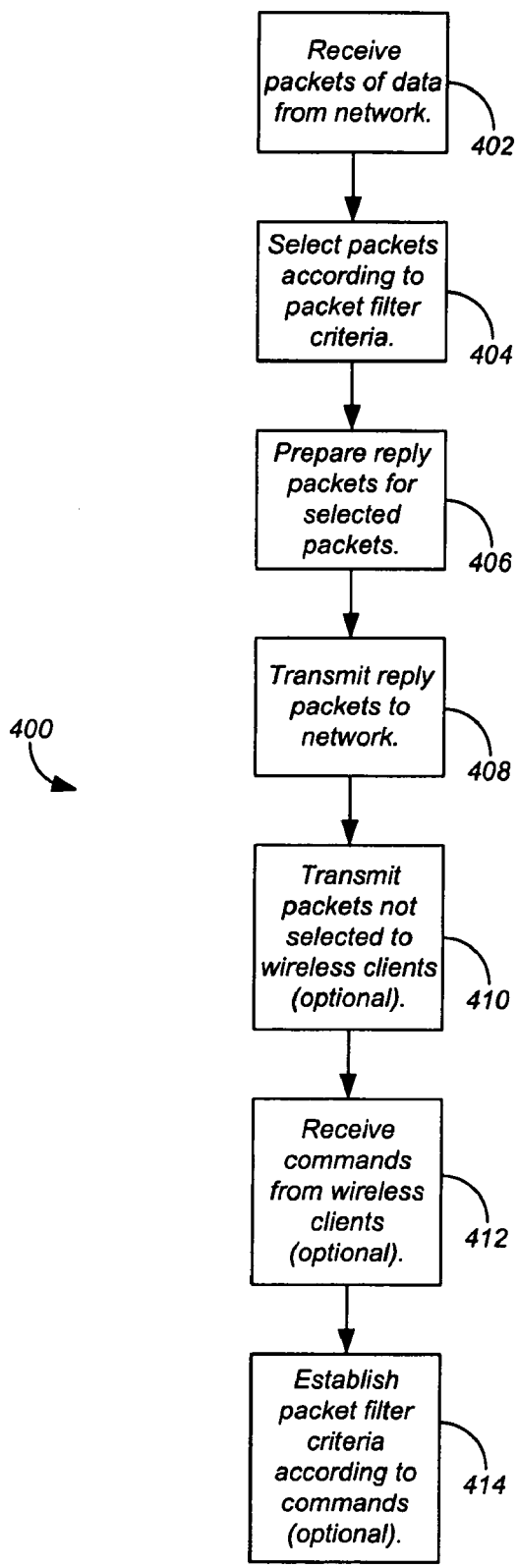
FIG. 4 shows a process for the apparatus of FIG. 3 according to a preferred embodiment of the present invention.

FIG. 4 shows a process 400 for apparatus 302 of FIG. 3 according to a preferred embodiment of the present invention. Input circuit 308 receives packets of data from network 306 (step 402). Filter circuit 312 selects one or more of the packets of data according to packet filter criteria stored in memory 310 for wireless clients 304 (step 404). Packet circuit 320 prepares one or more reply packets for each of the packets of data that are selected by filter circuit 312 (step 406). Output circuit 322 transmits the reply packets to network 306 (step 408).

In some embodiments, apparatus 302 also drops the packets to which it replies, so that wireless clients 304 neither reply to, nor receive, the packets. According to these embodiments, wireless output circuit 314 wirelessly transmits, to wireless clients 304, only the packets of data that are not selected by filter circuit 312 (step 410).

By performing process 400 of FIG. 4, apparatus 302 offloads processing of routine packets from wireless clients 304. The packet filter criteria specifies which packets should be replied to by apparatus 302, and in some embodiments, should not be forwarded to wireless clients 304. These packets can include, for example, Address Resolution Protocol (ARP) packets having a network address of one of wireless clients 304 as a target address, Internet Control Message Protocol (ICMP) echo packets having a network addresses of one of wireless clients 304 as a destination address, Internet Group Messaging Protocol (IGMP) packets having a network address of one of wireless clients 304 as a destination address, and the like.

The packet filter criteria can apply to all wireless clients 304 served by apparatus 302, or can be specific to each wireless client 304. For example, memory 310 stores the network addresses of wireless clients 304, and filter circuit 312 selects the packets of data according to the packet filter criteria, destination addresses of the packets of data, and the network addresses of wireless clients 304.

In some embodiments, the packet filter criteria is provisioned in advance of operation, by a remote controller, and the like. In other embodiments, the packet filter criteria is established by wireless clients 304. For example, referring again to FIG. 3, apparatus 302 optionally comprises a wireless input circuit 316 in communication with wireless clients 304 and a control circuit 318. Referring again to FIG. 4, wireless input circuit 316 receives wireless signals representing one or more commands from wireless clients 304 (step 412), and control circuit 318 establishes the packet filter criteria according to the commands (step 414).

Figure 5:
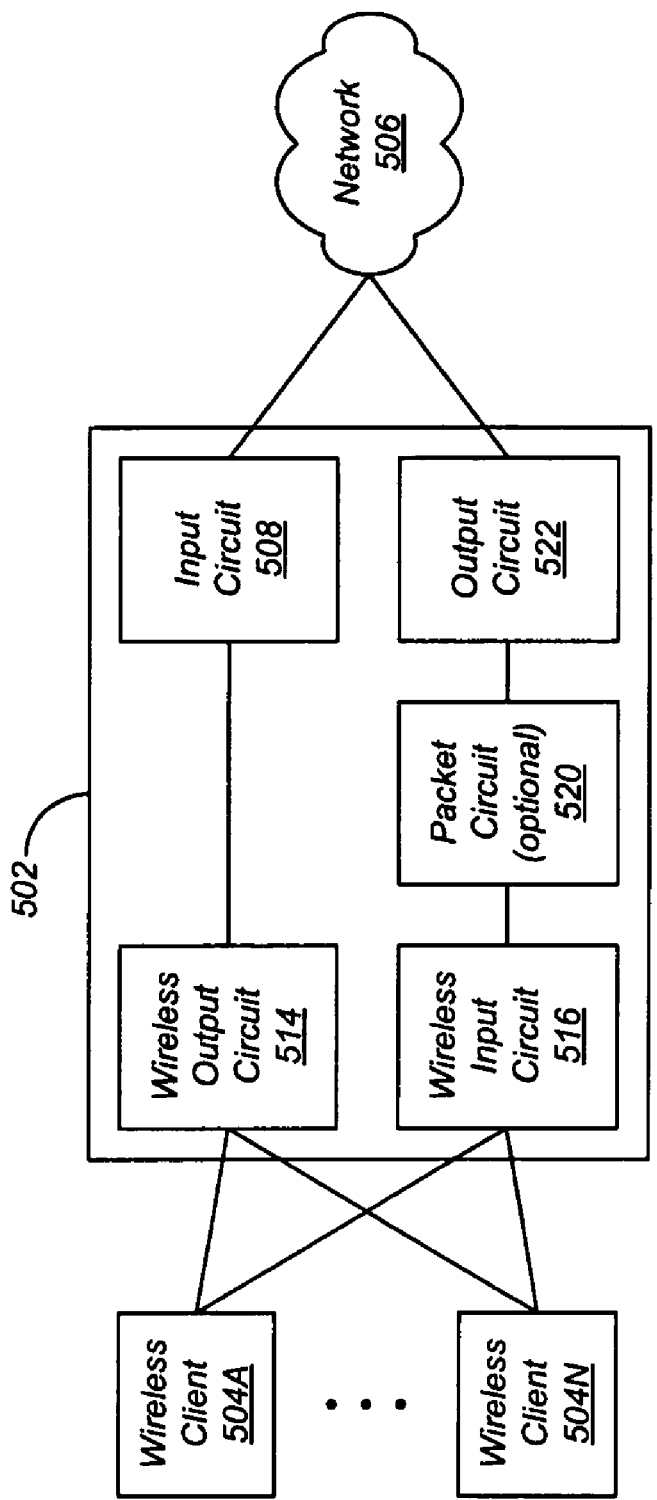
FIG. 5 shows an apparatus in communication with one or more wireless clients and a network for generating packets on behalf of wireless clients according to a preferred embodiment of the present invention.

FIG. 5 shows an apparatus 502 in communication with one or more wireless clients 504A-N and a network 506 for generating packets on behalf of wireless clients 504 according to a preferred embodiment of the present invention. Network 506 can comprise a local-area network, the Internet, and the like. Apparatus 502 comprises an input circuit 508 in communication with network 506, a wireless output circuit 514 in communication with wireless clients 504, an output circuit 522 in communication with network 506, and a wireless input circuit 516 in communication with wireless clients 504.

Apparatus 502 can be implemented as one or more units in various configurations. For example, apparatus 502 can be implemented as one or more thin access points and a wireless switch that manages the thin access points. As another example, apparatus 502 can be implemented as one or more thin wireless terminal points and an access controller that manages the thin wireless terminal points. As another example, apparatus 502 can be implemented as one or more fully-functional access points. Of course, other configurations are possible, and embodiments of the present invention are not limited to any particular configuration.

Figure 6:
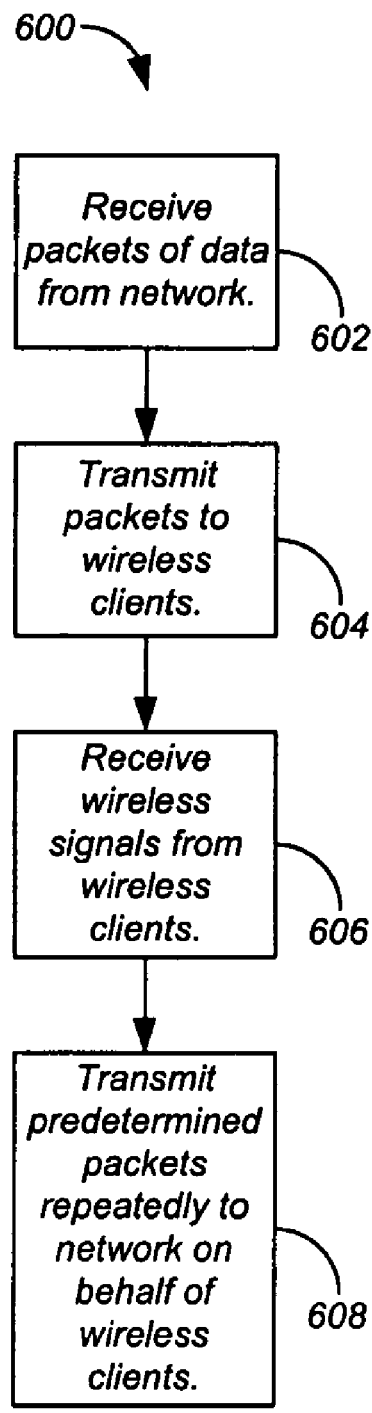
FIG. 6 shows a process for the apparatus of FIG. 5 according to a preferred embodiment of the present invention.

FIG. 6 shows a process 600 for apparatus 502 of FIG. 5 according to a preferred embodiment of the present invention. Input circuit 508 receives packets of data from network 506 (step 602). Wireless output circuit 514 transmits respective ones of the packets of data wirelessly to wireless clients 504 (step 604). Wireless input circuit 516 receives wireless signals from wireless clients 504 (step 606). Output circuit 522 transmits one or more predetermined packets repeatedly to network 506 on behalf of a wireless client 504 in response to the wireless signals received by wireless input circuit 516 from the wireless client 504 (step 608).

Preferably the wireless signals represent one or more commands, and an optional packet circuit 520 generates the predetermined packets according to the commands. For example, a wireless client 504 can join an Internet Group Messaging Protocol (IGMP) group that requires each member to send periodic IGMP join packets, and can then instruct apparatus 502 to send the join packets periodically on behalf of wireless client 504. As a further example, a wireless client 504 can lease a network address from a Dynamic Host Configuration Protocol (DHCP) server that ends the lease if it does not receive periodic "keep-alive" packets, and can then instruct apparatus 502 to send the keep-alive packets periodically on behalf of wireless client 504.

Some embodiments of the present invention provide wireless clients such as mobile phones, personal digital assistants (PDA), and the like, having circuits that can be disabled, for example by disconnecting the circuits from a power supply, when the signals received by the wireless client do not meet predetermined criteria. For example, in a PDA according to a preferred embodiment of the present invention, the processor and display can be powered off until a wireless signal is received that represents packets addressed to the PDA.

Figure 7:
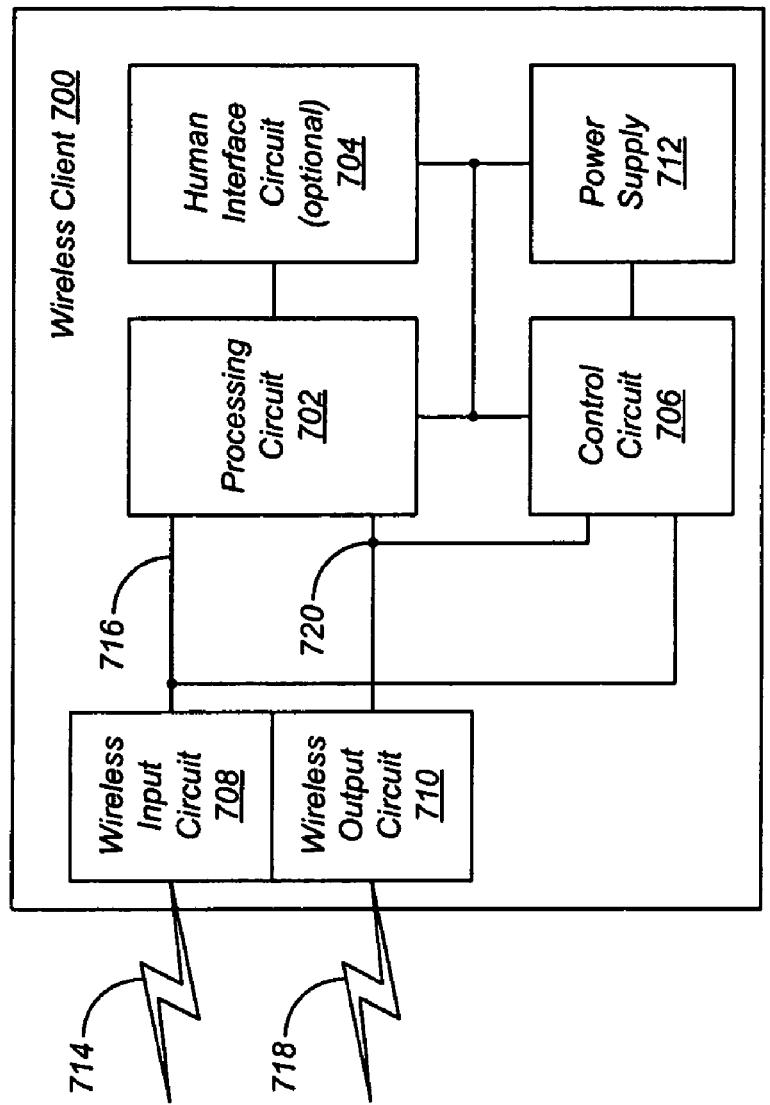
FIG. 7 shows a wireless client according to a preferred embodiment of the present invention.

FIG. 7 shows a wireless client 700 according to a preferred embodiment of the present invention. Wireless client 700 comprises a processing circuit 702, an optional human interface circuit 704, a control circuit 706, a wireless input circuit 708, a wireless output circuit 710, and a power supply 712.

Figure 8:
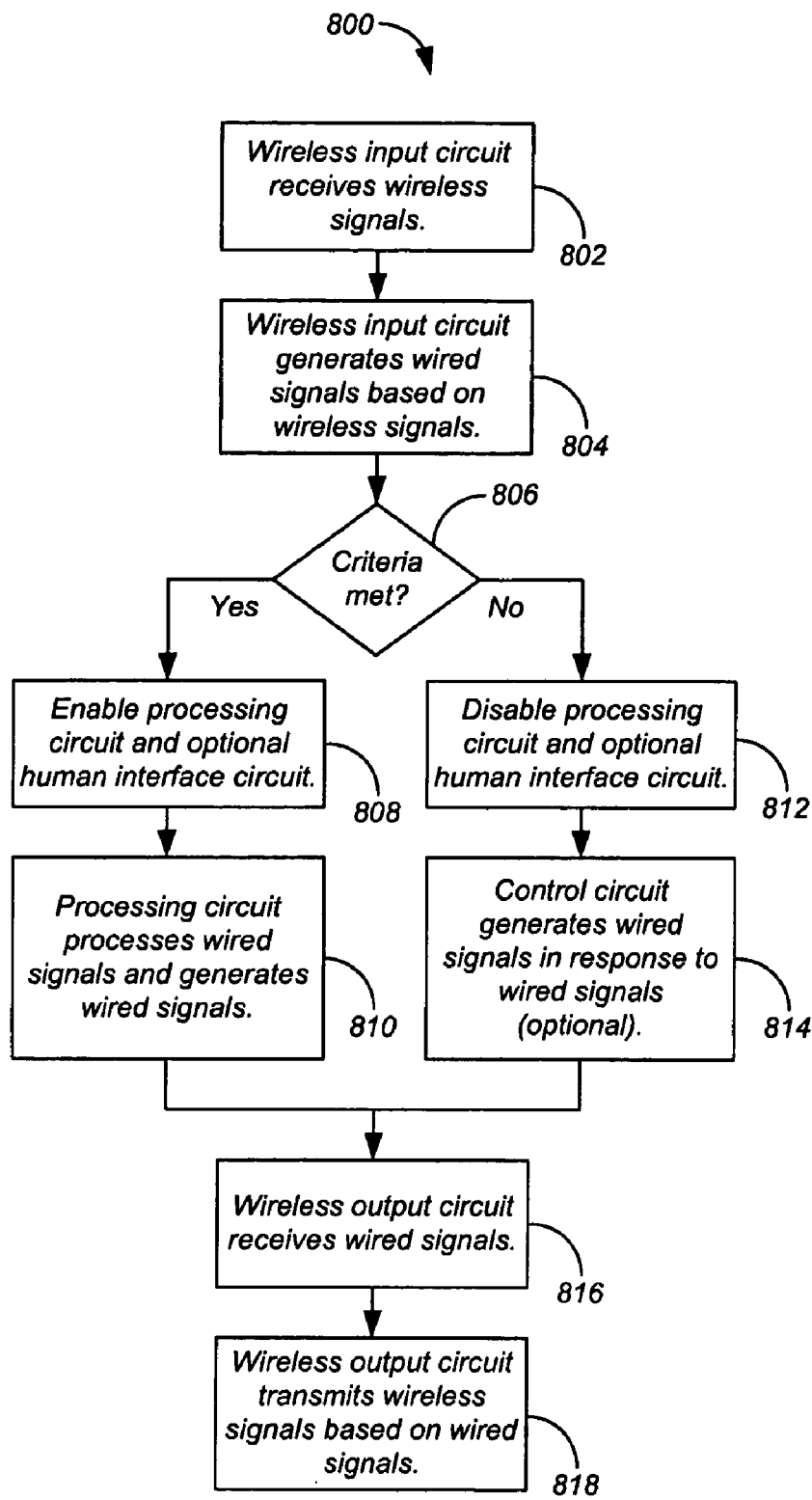
FIG. 8 shows a process for the wireless client of FIG. 7 according to a preferred embodiment of the present invention.

FIG. 8 shows a process 800 for wireless client 700 of FIG. 7 according to a preferred embodiment of the present invention. Wireless input circuit 708 receives wireless signals 714 (step 802), and generates wired signals 716 based on wireless signals 714 (step 804).

Control circuit 706 determines whether wired signals 716 meet predetermined criteria (step 806). The predetermined criteria can include predetermined physical-layer criteria, predetermined data link-layer criteria, predetermined network-layer criteria, predetermined transport-layer criteria, and the like.

When wired signals 716 meet the predetermined criteria, control circuit 706 enables processing circuit 702 and optional human interface circuit 704 (step 808), for example by asserting an enable signal and/or connecting power supply 712 to processing circuit 702 and optional human interface circuit 704. When enabled, processing circuit 702 processes wired signals 716 and generates wired signals 720 (step 810).

However, when wired signals 716 do not meet the predetermined criteria, control circuit 706 disables processing circuit 702 and optional human interface circuit 704 (step 812), for example by negating an enable signal and/or disconnecting power supply 712 from processing circuit 702 and optional human interface circuit 704. In some embodiments, control circuit 706 generates second wired signals 720 in response to wired signals 716 when the wired signals 716 do not meet the predetermined criteria (step 814). For example, control circuit 706 can generate reply packets in response to packets represented by wired signal 716 as described above.

Wireless output circuit 710 receives wired signals 720 (step 816) and transmits wireless signals 718 based on wired signals 720 (step 818).

Referring now to FIGS. 9A-9E, various exemplary implementations of the present invention are shown.

Figure 9B:
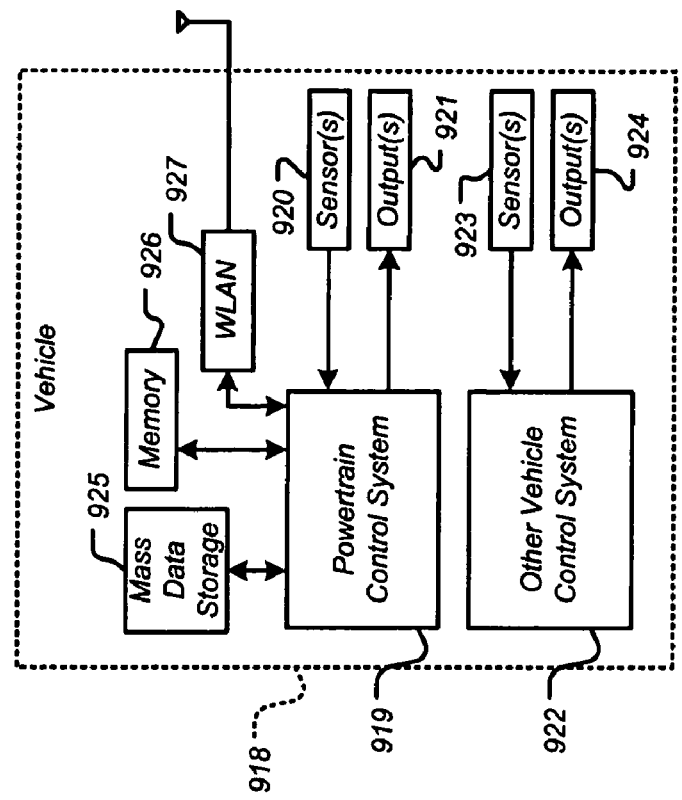
FIGS. 9A-9E show various exemplary implementations of the present invention.
Figure 9A:
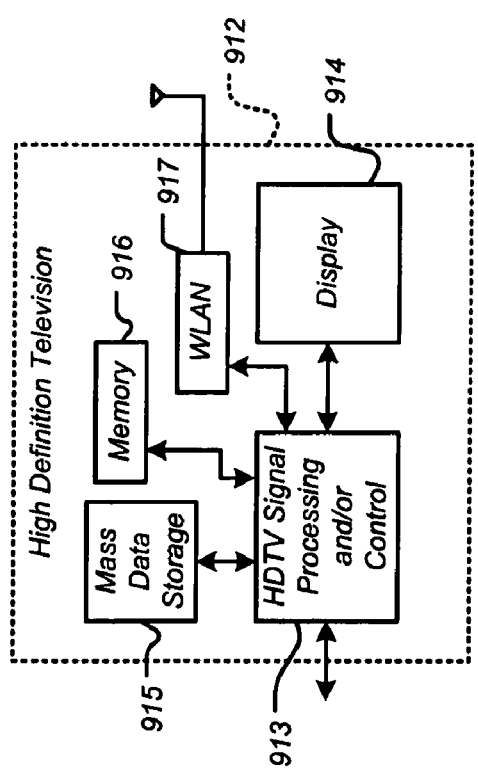

Referring now to FIG. 9A, the present invention can be implemented in a high definition television (HDTV) 912. The present invention may implement either or both signal processing and/or control circuits, which are generally identified in FIG. 9A at 913, a WLAN interface and/or mass data storage of the HDTV 912. The HDTV 912 receives HDTV input signals in either a wired or wireless format and generates HDTV output signals for a display 914. In some implementations, signal processing circuit and/or control circuit 913 and/or other circuits (not shown) of the HDTV 912 may process data, perform coding and/or encryption, perform calculations, format data and/or perform any other type of HDTV processing that may be required.

The HDTV 912 may communicate with mass data storage 915 that stores data in a nonvolatile manner such as optical and/or magnetic storage devices. The HDD may be a mini HDD that includes one or more platters having a diameter that is smaller than approximately 1.8". The HDTV 912 may be connected to memory 916 such as RAM, ROM, low latency nonvolatile memory such as flash memory and/or other suitable electronic data storage. The HDTV 912 also may support connections with a WLAN via a WLAN network interface 917.

Referring now to FIG. 9B, the present invention implements a control system of a vehicle 918, a WLAN interface and/or mass data storage of the vehicle control system. In some implementations, the present invention implements a powertrain control system 919 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 922 of the vehicle 918. The control system 922 may likewise receive signals from input sensors 923 and/or output control signals to one or more output devices 924. In some implementations, the control system 922 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 919 may communicate with mass data storage 925 that stores data in a nonvolatile manner. The mass data storage 925 may include optical and/or magnetic storage devices for example hard disk drives HDD and/or DVDs. The HDD may be a mini HDD that includes one or more platters having a diameter that is smaller than approximately 1.8". The powertrain control system 919 may be connected to memory 926 such as RAM, ROM, low latency nonvolatile memory such as flash memory and/or other suitable electronic data storage. The powertrain control system 919 also may support connections with a WLAN via a WLAN network interface 927. The control system 922 may also include mass data storage, memory and/or a WLAN interface (all not shown).

Figure 9C:
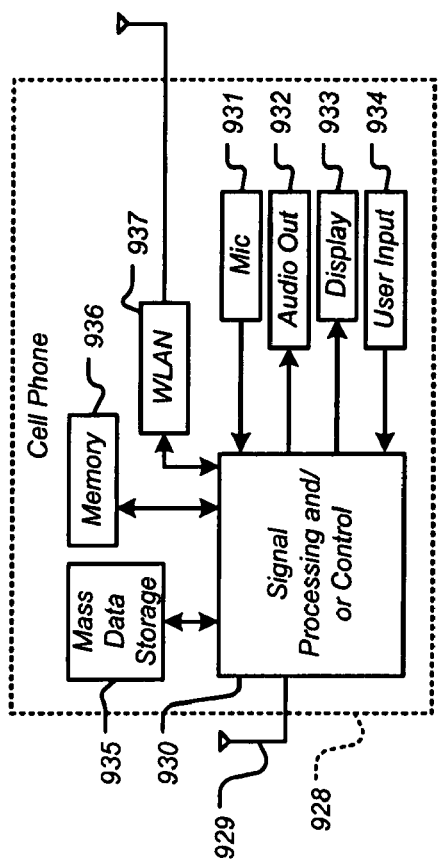

Referring now to FIG. 9C, the present invention can be implemented in a cellular phone 928 that may include a cellular antenna 929. The present invention may implement either or both signal processing and/or control circuits, which are generally identified in FIG. 9C at 930, a WLAN interface and/or mass data storage of the cellular phone 928. In some implementations, the cellular phone 928 includes a microphone 931, an audio output 932 such as a speaker and/or audio output jack, a display 933 and/or an input device 934 such as a keypad, pointing device, voice actuation and/or other input device. The signal processing and/or control circuits 930 and/or other circuits (not shown) in the cellular phone 928 may process data, perform coding and/or encryption, perform calculations, format data and/or perform other cellular phone functions.

The cellular phone 928 may communicate with mass data storage 935 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 928 may be connected to memory 936 such as RAM, ROM, low latency nonvolatile memory such as flash memory and/or other suitable electronic data storage. The cellular phone 928 also may support connections with a WLAN via a WLAN network interface 937.

Figure 9D:
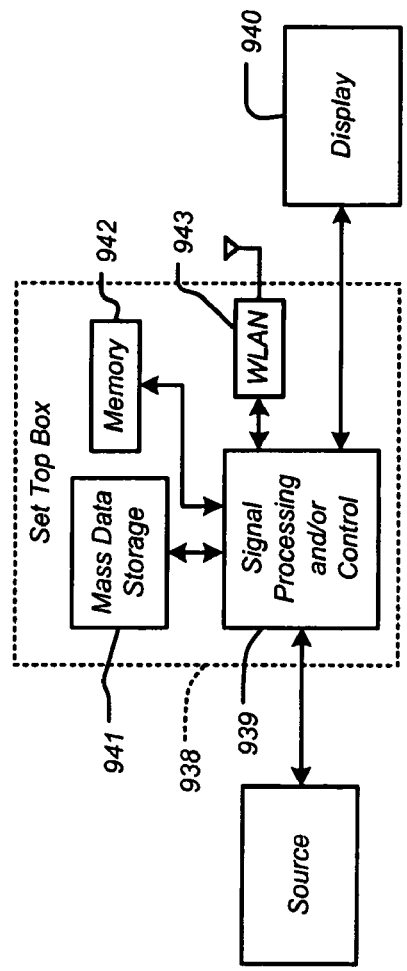

Referring now to FIG. 9D, the present invention can be implemented in a set top box 938. The present invention may implement either or both signal processing and/or control circuits, which are generally identified in FIG. 9D at 939, a WLAN interface and/or mass data storage of the set top box 938. The set top box 938 receives signals from a source such as a broadband source and outputs standard and/or high definition audio/video signals suitable for a display 940 such as a television and/or monitor and/or other video and/or audio output devices. The signal processing and/or control circuits 939 and/or other circuits (not shown) of the set top box 938 may process data, perform coding and/or encryption, perform calculations, format data and/or perform any other set top box function.

The set top box 938 may communicate with mass data storage 943 that stores data in a nonvolatile manner. The mass data storage 943 may include optical and/or magnetic storage devices for example hard disk drives HDD and/or DVDs. The HDD may be a mini HDD that includes one or more platters having a diameter that is smaller than approximately 1.8". The set top box 938 may be connected to memory 942 such as RAM, ROM, low latency nonvolatile memory such as flash memory and/or other suitable electronic data storage. The set top box 938 also may support connections with a WLAN via a WLAN network interface 943.

Figure 9E:
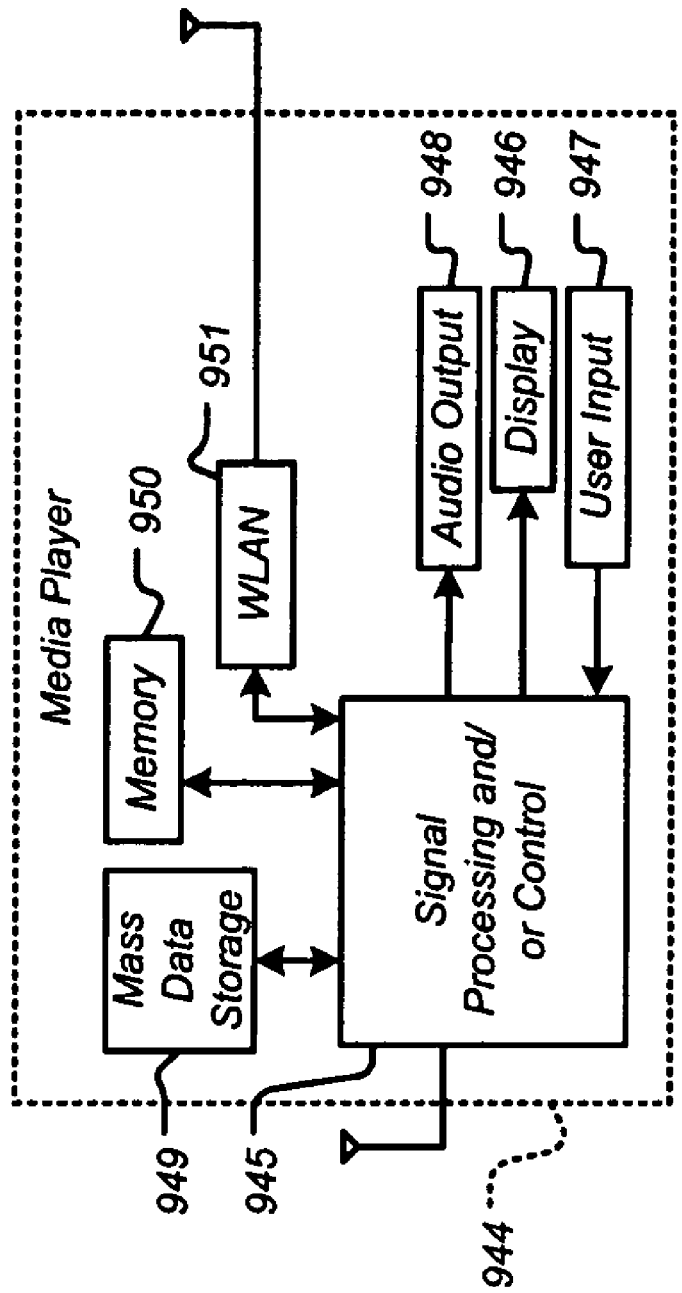

Referring now to FIG. 9E, the present invention can be implemented in a media player 944. The present invention may implement either or both signal processing and/or control circuits, which are generally identified in FIG. 9E at 945, a WLAN interface and/or mass data storage of the media player 944. In some implementations, the media player 944 includes a display 946 and/or a user input 947 such as a keypad, touchpad and the like. In some implementations, the media player 944 may employ a graphical user interface (GUI) that typically employs menus, drop down menus, icons and/or a point-and-click interface via the display 946 and/or user input 947. The media player 944 further includes an audio output 948 such as a speaker and/or audio output jack. The signal processing and/or control circuits 945 and/or other circuits (not shown) of the media player 944 may process data, perform coding and/or encryption, perform calculations, format data and/or perform any other media player function.

The media player 944 may communicate with mass data storage 949 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 944 may be connected to memory 950 such as RAM, ROM, low latency nonvolatile memory such as flash memory and/or other suitable electronic data storage. The media player 944 also may support connections with a WLAN via a WLAN network interface 951. Still other implementations in addition to those described above are contemplated.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A wireless network device, comprising:
a wireless input circuit configured to
receive first wireless network signals, and
generate first wired signals based on the first wireless network signals;
a wireless output circuit configured to transmit second wireless network signals based on second wired signals;
a processing circuit configured to
process the first wired signals, and
generate the second wired signals only when the processing circuit is enabled; and
a control circuit independent of the processing circuit, the control circuit configured to
receive the first wired signals,
enable the processing circuit when the first wired signals meet predetermined wireless network criteria, and
disable the processing circuit when the first wired signals do not meet the predetermined wireless network criteria,
wherein the control circuit is configured to transmit an enable signal to the processing circuit to enable the processing circuit, and
wherein the control circuit is configured to generate the second wired signals to be transmitted by the wireless output circuit as the second wireless network signals when the processing circuit is not enabled.

2. The wireless network device of claim 1:
wherein, to disable the processing circuit, the control circuit is configured to disconnect a power supply from the processing circuit.

3. The wireless network device of claim 1:
wherein the control circuit is configured to generate the second wired signals in response to the first wired signals when the first wired signals do not meet the predetermined wireless network criteria.

4. The wireless network device of claim 1, further comprising:
a human interface circuit configured to interface with humans only when enabled;
wherein the control circuit is configured to (i) enable the human interface circuit when the first wired signals meet the predetermined wireless network criteria, and (ii) disable the human interface circuit when the first wired signals do not meet the predetermined wireless network criteria.

5. The wireless network device of claim 4:
wherein, to disable the human interface circuit, the control circuit is configured to disconnect a power supply from the human interface circuit.

6. A wireless client comprising the wireless network device of claim 4.

7. A mobile phone comprising the wireless client of claim 6.

8. A personal digital assistant comprising the wireless client of claim 6.

9. A method for processing signals at a wireless network device, the wireless network device comprising a processing circuit, the method comprising:
receiving first wireless network signals at the processing circuit and at a control circuit, the control circuit being independent of the processing circuit;
generating first wired signals based on the first wireless network signals;
transmitting second wireless network signals based on second wired signals; and
using the control circuit to enable the processing circuit to (i) process the first wired signals and (ii) generate the second wired signals, wherein the processing circuit is enabled only when the first wired signals meet predetermined wireless network criteria,
wherein the predetermined wireless network criteria includes a protocol type, and the control circuit transmits an enable signal to the processing circuit to enable the processing circuit, and
when the processing circuit is not enabled, the control circuit is used to generate the second wired signals as the second wireless network signals.

10. The method of claim 9, further comprising:
when the first wired signals do not meet predetermined wireless network criteria, disconnecting a power supply from the processing circuit to disable the processing circuit.

11. The method of claim 9, further comprising:
when the first wired signals do not meet the predetermined wireless network criteria, using the control circuit to generate the second wired signals in response to the first wired signals.

12. The method of claim 9, wherein:
the wireless network device further comprises a human interface circuit; and
the method further comprises
when the first wired signals meet the predetermined wireless network criteria, enabling the human interface circuit; and
when the first wired signals do not meet the predetermined wireless network criteria, disabling the human interface circuit.

13. The method of claim 12, further comprising:
when the first wired signals do not meet the predetermined wireless network criteria, disconnecting a power supply from the human interface circuit to disable the human interface circuit.

14. The method of claim 12, wherein the wireless network device comprises a wireless client.

15. The method of claim 12, wherein the wireless network device comprises a mobile phone.

16. The method of claim 12, wherein the wireless network device comprises a personal digital assistant.

* * * * *